United States Patent [19]
Gerhardt et al.

[11] Patent Number: 4,786,384
[45] Date of Patent: Nov. 22, 1988

[54] ELECTROYTIC CELL FOR TREATMENT OF METAL ION CONTAINING INDUSTRIAL WASTE WATER

[75] Inventors: Wolfgang Gerhardt, Freigericht; Wolfgang Gehlert, Johannesberg; Edgar Glück, Flörsbachtal, all of Fed. Rep. of Germany

[73] Assignee: Heraeus Elektroden GmbH, Hanau, Fed. Rep. of Germany

[21] Appl. No.: 121,926

[22] Filed: Nov. 18, 1987

[30] Foreign Application Priority Data

Nov. 24, 1986 [DE] Fed. Rep. of Germany ....... 3640020

[51] Int. Cl.$^4$ .......................... C02F 1/46; C25B 15/02; C25B 9/04
[52] U.S. Cl. ..................................... 204/149; 204/228; 204/253; 204/258; 204/269; 204/DIG. 13
[58] Field of Search ............... 204/228, 267–270, 204/DIG. 13, 253–258, 149, 151

[56] References Cited

U.S. PATENT DOCUMENTS

| | | | |
|---|---|---|---|
| 3,788,965 | 1/1974 | Holsinger | 204/273 X |
| 4,263,120 | 4/1981 | Berndt et al. | 204/273 |
| 4,399,020 | 8/1983 | Branchick et al. | 204/275 |
| 4,490,230 | 12/1984 | Fletcher | 204/267 X |

FOREIGN PATENT DOCUMENTS

1800954 6/1970 Fed. Rep. of Germany ...... 204/228

Primary Examiner—Donald R. Valentine
Attorney, Agent, or Firm—Frishauf, Holtz, Goodman & Woodward

[57] ABSTRACT

To provide for essentially uniform current density at the respective cathodes of an electrolytic cell, a plurality of cathodes are located, spaced from each other, at one side of an anode, and resistance elements connect the respective cathodes to a negative supply terminal or supply bus (N, 11), the resistance elements having respective resistance values which decrease as the distance of the respective cathode from the anode increases. A single anode (2), preferably separated from the cathode space (5) by an ion exchange membrane (6), can be located centrally within the cathodes; or two anodes can be located spaced from each other with a plurality of cathodes located therebetween. Each cathode is connected with a quick disconnect plug-or-push terminal to the respective current supply, which may be a controlled constant current source.

19 Claims, 8 Drawing Sheets

ELECTROYTIC CELL FOR TREATMENT OF METAL ION CONTAINING INDUSTRIAL WASTE WATER

Reference to related patent, the disclosure of which is hereby incorporated by reference:
U.S. Pat. No. 4,399,020, Branchick et al.

The present invention relates to an electrolytic cell, and more particularly to a cell capable of carrying out electrolysis for electrolytic removal of metals from a liquid containing metal ions, and more particularly for removal of metals from industrial waste waters which contain such metals and to a method of operating such a cell.

BACKGROUND

Metal finishing or metal plating plants, as well as electronic plants which make printed circuit boards, use water in the plating process which, when becoming waste water, is known as "plater's rinse water". This plater's rinse water contains remnants of copper or tin. Various processes to remove copper or tin from plater's rinse water have been proposed. Electrolysis is one of these processes; others are evaporation, and chemical precipitation.

The referenced U.S. Pat. No. 4,399,020, the disclosure of which is hereby incorporated by reference, describes an arrangement to remove metals from plater's rinse water, with or without recycling. An electrically conductive solution is placed in a trough or cell box of insulating material in which a plurality of alternatively located plate-like anodes or cathodes of spongy construction are inserted. The cathodes are pervious to the liquid and the waste water passes through the cathodes essentially perpendicular to their plate surface. Cations of the metals in the waste water are deposited on the cathodes.

It has been found that, as the cell is used for a long period of time, the pores of the cathodes will close due to the metal deposition thereon, resulting in a continuous reduction of the actual cathodic surface, and, as a consequence, a rise in specific cathodic current density. The final metal concentration is then limited by economics. The initially spongy cathodes become plugged, and throughput of the cell is decreased. Consequently, the cathodes must be frequently renewed.

THE INVENTION

It is an object to provide a simple arrangement of cathodes in which the surface relationship from cathode to anode is substantially increased, so that the electrolytic cells for metal deposition will become cheaper, cheaper to operate, and more efficient; additionally, the cathodes should be easily individually replaceable.

Briefly, in accordance with the present invention, at least two cathodes are located at one side of the anode. The cathodes are coupled to a negative or cathode supply bus through connections which have such characteristics that the current supply to the cathodes will be essentially uniform, e.g. have respective resistance to the individual cathodes which are of lesser resistance as the distance of the respective cathode from the anode increases.

In a preferred form of the invention, the anodes and cathodes are made of flat, essentially rectangular, stretched metal structures, of the same size. This arrangement ensures that all surfaces are parallel to each other. A connection line of the edges will be perpendicular to the electrode surfaces. The cathodes are spaced from each other by identical distances. The anode may be positioned centrally in a cell box, with a plurality of cathodes at either side of the anode. An array of 40 cathode plates, 20 on each side of the anodes, has been found to be suitable.

The metals of the cathodes preferably are made of the same material as a metal to be removed from the liquid, or of a material which is chemically resistant to the waste water which forms a catholyte. If a different metal is used for the cathode than the metal is chemically or electrochemically removed from the cathode structure. The anode preferably is made of a valve metal with an electro-catalytically active coating. The resistance connection means, in accordance with the present invention, which have different values for the respective cathodes, ensure that each cathode will have the appropriate current applied thereto. The resistances may be made of discrete resistors of different resistance values which are connected to the cathode over connecting lines of the same length; or connected to the cathode over connection lines of different lengths, in which the resistance of the connection to a negative supply bus is also considered as part of the resistance connection; alternatively, the resistance connection may be made of resistance wire of respectively different lengths connected between the respective cathodes and a negative supply bus or equivalent terminal; or by connecting controlled variable resistance elements, e.g. transistors, in series with the respective cathodes, or to provide constant uniform current sources for the electrodes.

DETAILED DESCRIPTION

Figure 1:
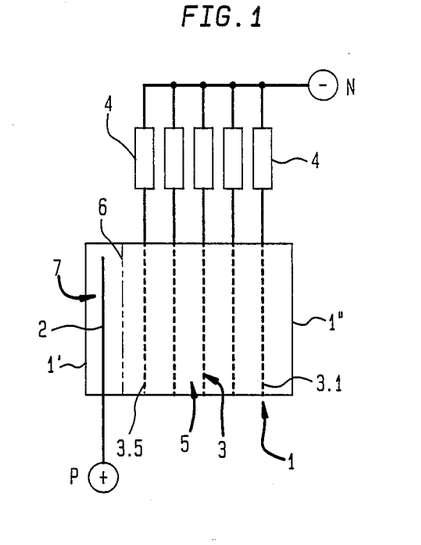
FIG. 1 is a schematic circuit diagram of a cell having one anode.

A cell box 1 of, for example, rectangular plan view, has end walls 1', 1''. The anode 2 which is adjacent to wall 1' is connected to a positive terminal or bus, shown schematically only at P and forming a positive current supply terminal or current supply bus. A plurality of planar cathodes 3 are located between the anode 2 and the opposite wall 1" of the cell box.

In accordance with the present invention, the cathodes 3 are connected to a negative supply terminal or supply bus N by resistance connections 4 of respectively different resistance values.

An ion exchange membrane 6 may be located between the anode and the next adjacent cathode 3.5. It is not strictly necessary, but is preferably used, since it ensures that the anode is always located within an anolytic chamber or space 7, whereas the waste water to be treated is supplied to the cathode chamber or space 5. The cathodes are perforated, as schematically shown by the broken-line cathodes 3 to permit current flow and passage of liquid therethrough. In accordance with a feature of the invention, the connection resistance values of the connection resistors 4 increase from the connection resistance of the cathode 3.1 which is most remote from the anode 2 up to the cathode 3.5 which is closest to the anode 2 in accordance with the formula:

$$0, R, 3R, 6R, 10R \ldots K_n \cdot R,$$

wherein $$K_n = 2 \cdot K_{n-1} + K_{n-2} \tag{1}$$

n is the overall number of the cathodes and the resistance value is $$R = (d/A \cdot \kappa) \tag{2}$$

wherein d is the distance to the adjacent cathode, A the projected surface of the cathode, and κ the conductivity of the liquid.

In the present case, the most remote cathode 3.1 may have a connection resistance of resistance value effectively zero, that is, the connection resistance 4 may be a connection cable or connection element which does not have any specifically assigned resistance value but, rather, in which the resistance value thereof is common to all the connection resistances as well.

Figure 2:
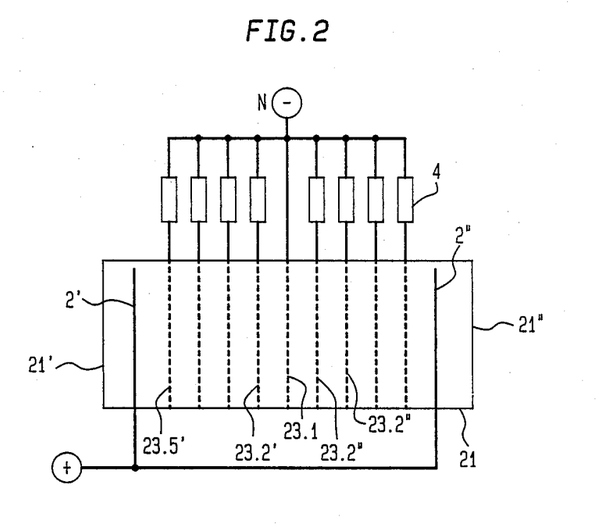
FIG. 2 is a schematic circuit diagram of a cell having two anodes.

FIG. 2 illustrates an embodiment with two anodes 2', 2" at opposite end walls of the cell box 21. The anodes, again, are located adjacent the respective cell box walls 21', 21". The central cathode 23.1 is connected to the negative bus N, so that the connection resistance between the electrode 23.1 and the negative bus N will be only the resistance inherent in the connection cable or connection line, and such terminal connection clamps and the like as may be used. Effectively, the resistance is almost zero. The two adjacent cathodes 23.2' and 23.2" are connected to the negative terminal or bus N with a resistance value R as above defined. All other connection resistors can be derived from the above formula. The cathodes 23.3, of which only cathode 23.3" is specifically identified, will have the resistance 3R. The cathodes 23.5, of which only the cathode 23.5' is specifically labeled for clarity of the drawing, will have the resistance value 10R in accordance with the above relationship.

Figure 3A:
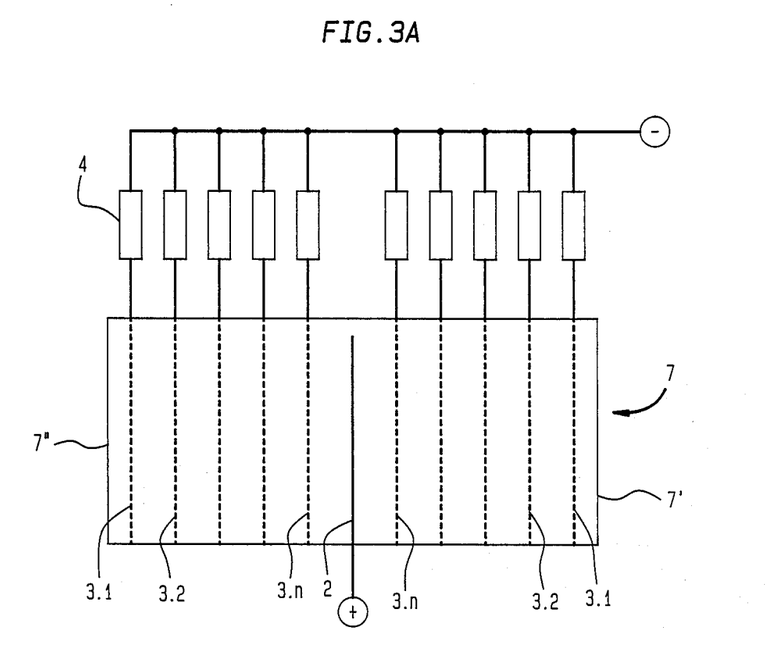
FIG. 3a is a schematic view similar to FIG. 1 and illustrating a central anode with cathode plates located on either side of the central anode plate.

An electrolysis cell which has been particularly well proven is illustrated schematically in FIG. 3a. The cell box 1 has a single anode 2 which is located centrally within the cell box. An equal number of cathodes 3.1, 3.2 ... 3n are located on either side of the anode 2, filling the vessel 1 up to the respective end walls 1', 1". For clarity of the drawing, only five cathodes are shown. A suitable number of cathodes, on either side of the anode 2, is, for example, about 20, so that about 40 cathodes, overall, are located within one cell box. The respective connecting resistors 4 connected to the cathodes 3.1 adjacent the end walls 1', 1" have a resistance value of effectively zero, that is, only the usual and customary connecting resistance of the connecting leads is present. Starting from those cathodes 3.1 most remote from the central anode 2, the connecting resistors 4 increase in accordance with the previously discussed system, so that the connecting resistors 4 for the cathodes 3.2 ... 3.n will have the resistance values R, 3R, 6R and 10R.

In an actual practical embodiment, the cell shown in FIG. 3a will have 20 cathodes at the respective sides of the anode 2, the connecting resistors 4 then having resistance values R.1 to R.20 as follows:

O, R, 3R, 6R, 10R, 15 R, 21R, 28R, 36R, 45R, 55R, 66R, 78R, 91R, 105R, 120R, 136R, 153R, 171R, 190R.

Figure 3B:
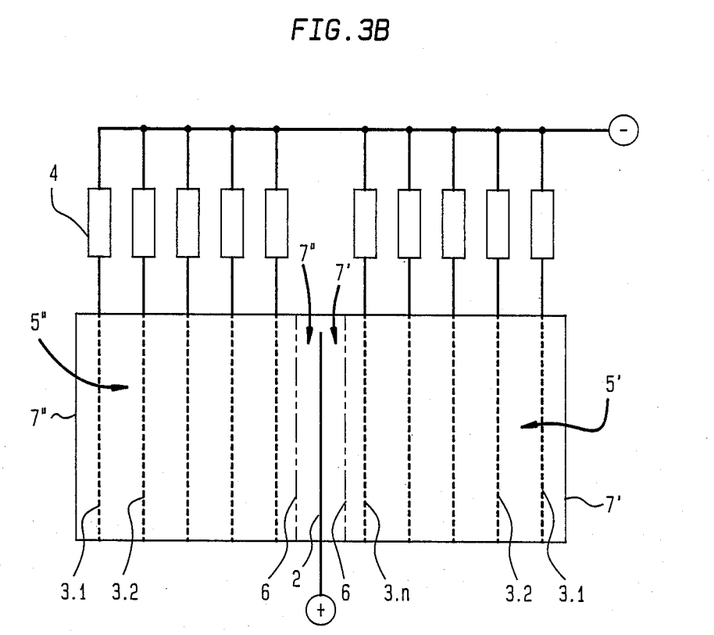
FIG. 3b is a schematic view similar to FIG. 3a and illustrating, additionally, placement of a membrane between the anode and cathode spaces.

FIG. 3b is a schematic view similar to that of FIG. 3a, with the addition of two ion exchange membranes 6, located on either side of the anode 2, and separating the cell box into anode space 7 and cathode spaces 5. Thus, the anode 2 is located in its own anolytic space 7. Such an arrangement has been found particularly suitable when treating waste water having organic components or chlorine containing components. A suitable anolyte then is sulfuric acid. The respective anode and cathode spaces opposite the anode 2 have been given the reference numerals 5', 5" and 7', 7" for consistency of notation.

Figure 4A:
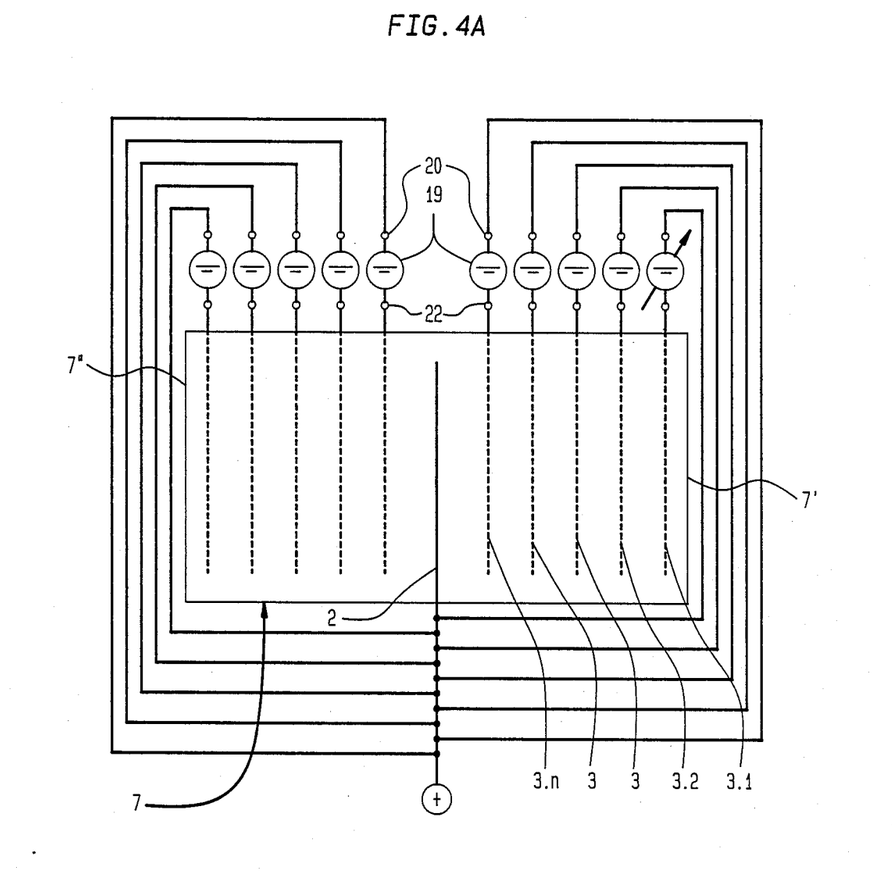
FIG. 4a is a schematic representation of a cell and current supply with constant current sources.

To obtain uniform current distribution, it is equally possible to supply the respective cathodes 3.1, 3.2 ... 3.n, positioned as shown in FIG. 4a, or as shown in FIG. 1 or 2, from respective current supply units 19. The current supply units 19 supply current of equal value to the respective cathodes. The positive terminal 20 of the respective current supply unit 19 is connected, in common, to the anode 2. The current supply units 19 are formed by controlled constant current sources. The cathodes are connected to the respective current supply units 19 over connection terminals 22 which permit ready disconnection, so that individual cathodes can be exchanged during operation of the cell by merely disconnecting a particular cathode which requires replacement.

The constant current sources 19, preferably, supply all cathodes with current of equal level; suitable constant current sources include energized transistors, in which the collector-emitter path is connected serially between the respective cathode and the common anode 2; the base of the transistor is controlled from a voltage divider including at least one variable resistor. Consequently, the inner or transfer resistance of the controlled current sources can be so adjusted that the inner resistance of the controlled current sources, as in the prior examples, can be decreased as the physical spacing of the respective cathode increases. In FIG. 4a, connection of control lines to the respective constant current sources 19 have been omitted for clarity of the drawing, and only one of the constant current sources have been shown to be specifically controllable by the schematic placement of an arrow therethrough - again for clarity of the drawing.

It is highly desirable to so control the constant current sources 19 that the current level of the current supply to all of the cathodes is practically identical. It is preferred to so control the constant current sources that the current density on the cathodes does not change by more than ±10% from an average value.

Figure 4B:
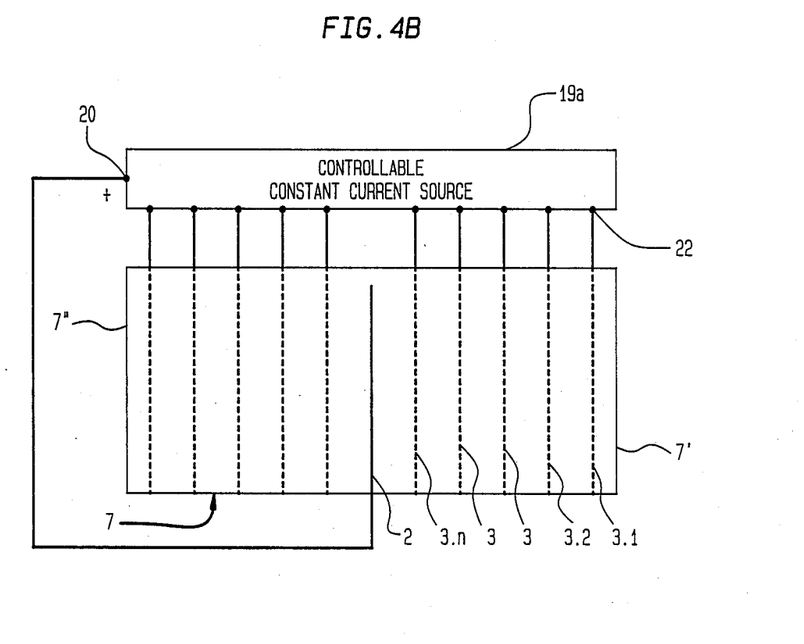
FIG. 4b is a schematic representation illustrating a single current supply unit with a plurality of current supply connections for the individual cathodes.

FIG. 4b illustrates a modification of the system shown in FIG. 4a, in which a single control current supply unit 19a is used, replacing the respective current supply units 19 of FIG. 4a. The unit 19a has an appropriate number of cathode terminals 22' and a single positive terminal 20, coupled to the anode 2. Again, it is important that the current level of the current supplied to the respective cathodes is practically identical so that the current density on the cathodes does not deviate by more than ±10% from an average value.

The electrolysis cells illustrated in FIGS. 4a, 4b are shown only highly schematically; of course, they may be supplied with an ion exchange membrane, as illustrated in FIG. 3b, to separate the electrolyte space into respective anode and cathode electrolyte spaces or chambers, respectively.

Figures 5A, 5B:
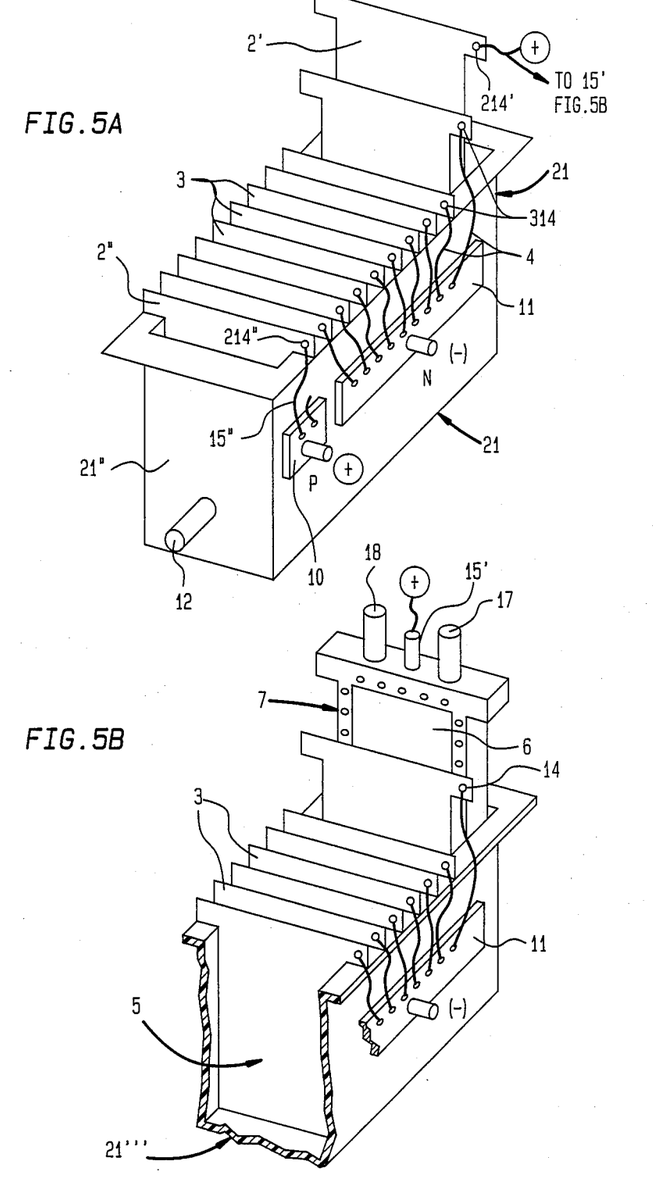
FIG. 5a is a perspective view of a cell.
FIG. 5b is a fragmentary sectional view of the cell of FIG. 3a and illustrating a modification, namely separation of the anode from the cathode space by a membrane.

The structure of the cell of FIG. 2 is seen in perspective view in FIG. 5a. The two anodes 2', 2" are located adjacent the end walls 21', 21". They are connected to a positive bus terminal 10 forming the positive current supply P. Nine cathodes 3 are located between the anodes 2', 2". All electrodes have the same surface and are located, at equal distances from each other.

The electrolyte box 21 is made of an electrolytically resistant, electrically insulating material, preferably a plastic, such as polypropylene or polyvinylchloride. The box 21 has an opening 12 at each one of its facing ends to form respectively liquid supply and drain connections for the waste water to be treated. A gas injection device is coupled to the bottom wall of the box 21 to ensure circulation of the liquid.

Two electrical current supply buses 10, 11 are located the side wall of the box 21. The bus 10, coupled to the positive supply P, is connected to the anodes 2', 2" by heavy cables of essentially zero resistance, in spite of the different lengths. A bus 11 is coupled to the negative supply N. The respective electrodes 3 are connected to the bus 11 over connection lines of different lengths made of a resistance wire material so that the different lengths provide, inherently, different resistances for the respective cathodes.

The buses 10, 11 are made, preferably, of copper or aluminum alloy rails. The connecting wires forming the resistance connections 4 are made of electrically insulated resistance wire, for example titanium wire or constantan wire.

The anodes 2', 2" may be made in form of a closed surface, a perforated sheet metal structure, a grid, or a stretched metal, that is a metal having fissures or a mesh; or may be of a plurality of lamella-like flat strips.

The material of the anodes, which must be electrically conductive and chemically and electrochemically stable within the anode electrolyte is preferably titanium, niobium, tantalum or alloys thereof, coated with an electro-catalytically active material.

The anodes have anode connection spades or connection lugs 214', 214". The connecting lines 15', 15' between the connection spades or lugs and the positive bus 10, preferably are made of the same material as the bus 10, that is, copper, aluminum, or a respective alloy. They are connected to the connection spades or lugs 214', 214" by a screw clamp connection; similarly, a screw clamp connection is used on the bus 10.

The cathodes 3 may be made of the same material as the metal which is to be precipitated from the liquid, so that, upon later refining, they can be melted together with the deposited metal. They are, again, formed as a stretched, fissured or mesh thin metal film or sheet, a perforated sheet, a wire mesh, or the like. The cathodes may, however, also be made of a metal which differs from that to be precipitated. In that case, the precipitated metal is chemically removed from the cathode structure.

The connection lugs or spades 314 of the respective cathodes 3 are preferably connected to the connection lines 4, which form the connection resistors or resistance by clamp or spade lug connections. Such an arrangement permits removal of individual cathodes and exchange of individual cathode elements during operation of the cell.

FIG. 5b, showing a fragmentary cut view of the cell of FIG. 5a, illustrates separation of the cathode space 5 from the anode space 7 by a membrane 6, so that the anode space 7 is completely separated from the cathode space 5. The cathode space 5 receives the waste water and may then form a catholyte space or chamber.

A suitable electrolyte in the anode space 7 is, for example, sulfuric acid, which is suitable for a large number of industrial waste waters by electrochemical treatment. The electrolyte level in the anode chamber 7 is in the upper region of the ion exchange membrane.

The anodic electrolyte in the anode space or chamber 7 is preferably circulated, and, for circulation, separate electrolyte supply and drain lines 17, 18 are provided. The anodes located in the respective anode chambers are planar at least at the side facing the membrane, with the anode surface extending parallel to the surfaces of the cathodes 3. Supply of waste water to the interior of the electrolytic box 21 is, preferably, in batches or charges. Treated water, with metal removed, can then be drained from the electrolyte cell box through a suitable drain cock.

The present invention permits use of only a small number of anodes. The anode material is comparatively expensive, and thus reducing the number of anodes is economically desirable. Additionally, the deposition of metal on the cathodes will be essentially uniform, and, as cathodes build up deposits, they can be individually replaced without shutting down the apparatus. Quick-connect or disconnect clamp or push terminals on the lugs 314 of the cathodes permit fast disconnection and reconnection in operation.

The embodiment using the ion exchange membrane 6 has the additional advantage that the versatility of the electrolytic apparatus is expanded, since treatment of chloride containing waste waters is readily possible.

Figure 6A:
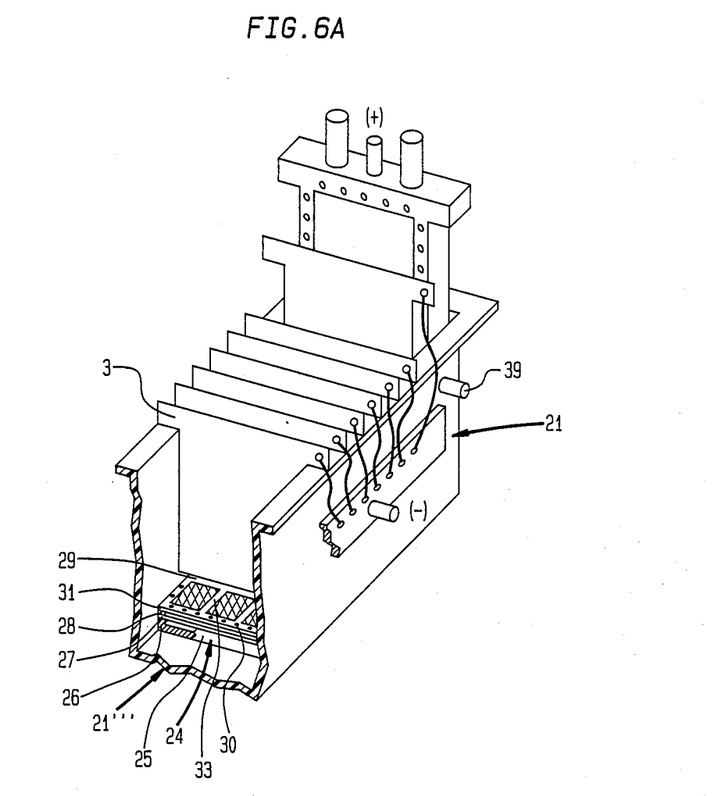
FIG. 6a is a view similar to FIG. 5a and illustrates an arrangement permitting air injection into the cell box.
Figure 6B:
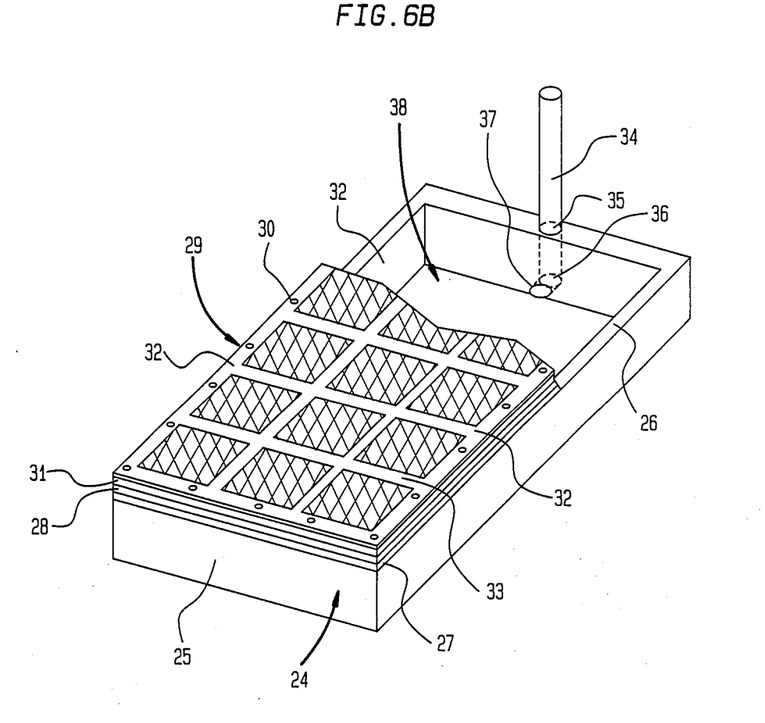
FIG. 6b is a detail view of an air injection arrangement.

Gas injection into the cell box is illustrated in FIG. 6a, utilizing the embodiment of FIG. 5b as an example. A gas injection system 24 is located in the bottom portion of the cell box 21, extending over essentially the entire surface of the bottom of the cell box. The actual gas injection structure is best seen in FIG. 6b.

The gas injection system 24 includes a plate-like base element 25 having a circumferentially extending rim 26. The rim 26 has a circumferential seal 27 and a porous plastic material, for example a porous plastic weave 28 secured thereto, covering the surface defined by the rim 26 of the base element 25. A frame 29 secures the plastic textile material 28 to the rim 26, the frame 29 being attached to the rim 26 by suitable attachment elements, shown as screws 30. A further circumferential seal 31 is located between the frame 29 and the plastic textile material 28.

Strip-like stiffening elements 33 are located between respectively opposite side portions 32 of the frame 29, positioned above the plastic textile material 28, to prevent bulging of the plastic 28 due to pneumatic pressure upon supplying gas under overpressure to the space beneath the plastic textile or fabric material 28.

The base element 25 of the gas injection system 24 preferably is made of plastic. The frame 29 and the associated stiffening strips 33 are preferably made of a metallic material which is resistant to the respective electrolyte, for example and preferably titanium. The plastic fabric 28 is preferably made of polypropylene, polyethylene, or polyvinylchloride.

A pipe 34, extending for example essentially vertically, that is, perpendicularly to the surface of the frame 25, is introduced into an opening 35 located within the rim 26 of the base element 25. The pipe 34 and the opening 35 are located in the region beyond the chamber enclosed by the circumferential seals 27, 31. A duct-like connecting opening 36 is pneumatically connected to the opening 35, and formed with an outlet opening or nozzle 37 extending into the chamber 38 defined by the base element 25 and the top thereof closed off by the plastic fabric 28. The pneumatic connection is shown schematically in broken lines in FIG. 6b.

The upper portion of the pipe 34 is carried through a suitable opening 39 (FIG. 6a) of the cell box 21. Preferably, the pipe 34 is made of the same material as the cell box 21.

Various changes and modifications may be made, and features described in connection with any one of the embodiments may be used with any of the others, within the scope of the inventive concept.

We claim:

1. Electrolytic cell for electrolytic removal of contaminants, especially metals, present in a liquid, particularly plater's rinse waste water, having
   a cell box (1, 21);
   a plurality of essentially sheet-like electrodes positioned parallel to each other within the cell box, said electrodes including
   at least one anode (2, 2', 2'') and at least two apertured cathodes (3, 3.1, ... 3n: 23.1, 23.2', 23.2'', ... 23n'');
   a positive supply terminal of bus (P, 10) coupled to the anode, and a negative supply bus (N, 11);
   wherein
   at least two cathodes (3.1, 3.2, ... 3n) are located on one side of the anode (2), at different and increasing distances from the anode,
   and comprising, in accordance with the invention,
   resistance means (4) connecting the respective cathodes, individually, to the negative supply box (N, 11), said resistance means (4) having respective resistance values which decrease as the distance from the anode of the respective connected cathode increases, said resistance means (4) comprising connecting means of identical material, but of different lengths.

2. The cell of claim 1, further including an ion exchange membrane (6) separating the anode from the cathodes and defining an anode chamber (7) within which the anode is located, and a cathode chamber (5) within which the cathode electrodes are positioned, and separating said chambers.

3. The cell of claim 1, further including a gas injection means (34–37) terminating inside the box to circulate the liquid within the box and around the cathode electrodes.

4. The cell of claim 3, wherein the gas injection means is located beneath the cathodes (3).

5. The cell of claim 4, wherein the gas injection means is located adjacent a bottom wall (21''') of the cell box (21).

6. The cell of claim 1, wherein the relationship of anode surface to the sum of the cathode surfaces is in the range of between about 1:2 to 1:50.

7. The cell of claim 1, wherein two anodes (2', 2'') are provided, and the at least two cathodes comprise at least three cathodes located between said two anodes.

8. The cell of claim 7, further including an ion exchange membrane (6) separating the anode from the cathodes and defining an anode chamber (7) within which the anode is located, and a cathode chamber (5) within which the cathode electrodes are positioned and separating said chambers.

9. The cell of claim 1, wherein the cathodes have identical surface areas and the spacing of the cathods between each other is identical.

10. The cell of claim 1, wherein the resistance means comprises connection resistor means (4) having resistance values which increase from the cathode which is most remote from the anode (2) up to the cathode which is closest to the anode (2) in accordance with the formula $$0, R, 3R, 6R, 10R \ldots K_n \cdot R,$$

wherein $$K_n = 2 \cdot K_{n-1} + 1 - K_{n-2}$$

n is the overall number of the cathodes and the resistance value is $R = (d/A \cdot \kappa)$
wherein d is the distance to the adjacent electrode, A the projected surface of the cathode, and $\kappa$ the conductivity of the liquid.

11. The cell of claim 1, wherein (FIGS. 4a, 4b) two groups or sets of cathodes (3) are provided, and the at least one anode comprises a single anode positioned between said groups or sets of cathodes.

12. The cell of claim 1, wherein said at least one anode comprises a single anode element (2), positioned centrally within said plurality of cathodes.

13. The cell of claim 12, further including two ion exchange membranes (6) separating the anode from the cathodes and defining an anode chamber (7) within which the anode is located, and two cathode chambers (5) within which the cathode electrodes are positioned, and separating said anode and cathode chambers.

14. The cell of claim 1, further including constant current supply source means (19, 19a) having connection terminals (22), each connected to a respective cathode;
   and wherein said resistance means (4) comprise controllable resistance elements controlled to apply essentially uniform current to the respectively connected cathodes.

15. The cell of claim 15, wherein the current applied to the respective cathodes does not vary by more than about ±10% from an average current value.

16. The cell of claim 14, wherein the controllable resistance elements comprise transistors.

17. A method of electrolytically removing contaminants, especially metals, present in a liquid, particularly plater's rinse waste water, by circulating the liquid through a cell box (1, 21);

said cell box having a plurality of essentially sheet-like electrodes positioned parallel to each other within the cell box, said electrodes including at least one anode (2, 2', 2'') and at least two apertured cathodes (3, 3.1, ... 3n; 23.1, 23.2', 23.2'', ... 23n''), wherein said at least two cathodes (3.1, 3.2, ... 3n) are located on one side of the anode (2), at respectively different, increasing distances from the anode;

and comprising, in accordance with the invention, the steps of controlling the current flow to the respective cathodes, individually, by connecting said cathodes to a constant current source means (19, 19a) controllable to provide for essentially uniform current density, in operation of the cell, of current flow from all said respective cathodes.

18. The method of claim 17, wherein the step of controlling the current low to the respective cathodes comprises connecting the respective cathodes to said current source through resistors of respectively different resistance values, in which the respective resistance values decrease as the distance of the respective connected cathodes from the anode increases.

19. The method of claim 17, wherein the step of applying said essentially uniform current to said cathodes comprises applying current to individual cathodes which does not vary more than about ±10% from an average value.

* * * * *